Figure 1:
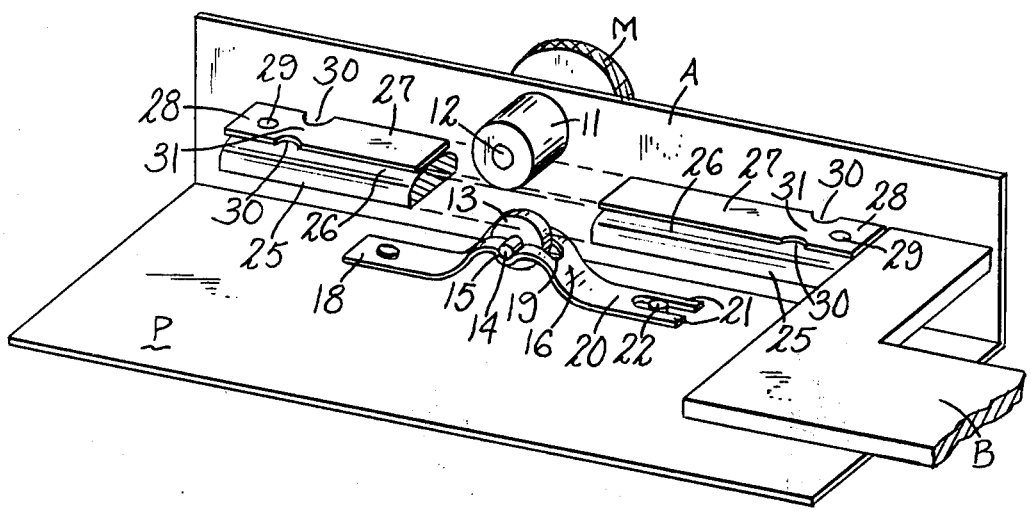

United States Patent [19]

Santoro

[11] 4,248,101

[45] Feb. 3, 1981

[54] DRIVE UNITS PROVIDED WITH DRIVING ROLLERS

[75] Inventor: Giovanni Santoro, Rome, Italy

[73] Assignee: Werbetronic AG, Mauren, Liechtenstein

[21] Appl. No.: 940,825

[22] Filed: Sep. 8, 1978

[30] Foreign Application Priority Data

Sep. 9, 1977 [IT] Italy .................................. 50949 A/77

[51] Int. Cl.³ ...................... F16H 35/18; F16H 21/44
[52] U.S. Cl. .................................. 74/10 R; 74/10.33; 74/89; 74/99 R; 308/3 R
[58] Field of Search ................ 74/10 R, 10.33, 10.37, 74/89, 99 R; 334/7; 308/3 R

[56] References Cited

U.S. PATENT DOCUMENTS

| | | | |
|---|---|---|---|
| 3,602,051 | 8/1971 | Olah | 334/7 X |
| 3,724,280 | 4/1973 | Olah | 74/10.33 |

*Primary Examiner*—Allan D. Herrmann
*Attorney, Agent, or Firm*—DeLio and Montgomery

[57] ABSTRACT

A driving unit having a rotatable driving roller and a driven roller, an elongated member capable of moving longitudinally and independently of the rollers, said elongated member comprising a rigid bar with a rounded upper surface and a strip of flexible material in contact with said surface, said driving roller engaging said flexible strip and said strip remaining substantially tangential to the rounded upper surface regardless of the position of the rotatable driving roller or the interrelationship of the various parts.

18 Claims, 2 Drawing Figures

DRIVE UNITS PROVIDED WITH DRIVING ROLLERS

This invention relates to an improvement in drive units provided with driving rollers and more particularly in such units where the rotating rollers cause an elongated member associated thereto and engaged with the rollers to be moved longitudinally in both directions and where this elongated member can move independently of the rollers which do not rotate, frictionally sliding in respect thereto.

A unit of this type is particlarly, if not exclusively, applied in tuning apparatus, particularly in car radio apparatus, which are provided with a mechanical tuning device having a plurality of push buttons, in which device a plurality of stations can be stored. The apparatus is readily and precisely tuned on each station by pushing the associated push button.

Among known units, a more commonly used unit comprises a resilient and flexible metal strip inserted between two rollers elastically pushed against each other. One of these two rollers is idle while the second roller is keyed on the shaft of the tuning knob of the apparatus. The metal strip is connected to a longitudinally movable rod whose position controls the tuning circuit of the radio apparatus thus controlling the frequency on which the apparatus is tuned. With such an arrangement the rotation of the knob in one or the other direction transmitted to the rollers determines the longitudinal movement of the strip engaged with the rollers and accordingly the tuning of the apparatus by means of the rod connected to the strip.

Furthermore, this rod and the strip associated thereto must move also when any tuning push button is actuated upon and thereupon the necessity rises that the rod and strip be moved in respect to the rollers being stationary and namely that a relative frictional movement takes place.

The above described units have the drawback that the driving action exerted on the strip by the roller is discontinuous.

From a geometric point of view, an optimal driving action on the strip by means of two rollers engaging the strip gripped therebetween can be obtained only if the portion of plane defined by the strip is always perfectly tangent to the cylindrical surface of a roller with which the strip is engaged. In practice, however, this is impossible since, both for the inevitable unevenness of this cylindrical surface and for the tolerance in manufacturing and assembling the knob shaft on which the driving roller is mounted, the generating lines of the cylindrical surface of the rotating roller do not remain parallel to the plane of the strip. These generating lines describe an approximately conic surface to which the strip cannot remain tangent because, for operation requirements, the longitudinally movable rod to which the strip is connected is rigid and forced by guides to move longitudinally yet remaining in the same plane.

This means that the strip cannot engage the rotating roller throughout the width thereof and accordingly the driving action is irregular and this affects the precise tuning of the apparatus by the knob.

Accordingly, it is a main object of the invention to provide a driving unit of the above described type wherein the driven element continously engages the roller throughout the width thereof, that is geometrically speaking a unit wherein the driven element surface engaging the roller surface is continuously tangent to the corresponding generating line of the cylindrical surface of the roller itself.

According to the invention, in order to obtain this tangency allowing the best engagement condition between the driving roller and the driven element, the unit comprises: a composite driven elongated element comprising a rigid bar of a certain thickness and a particular cross section and a thin flat strip backed thereby; a roller engaging this strip and a wheel engaging this backing bar. The roller is keyed on the shaft of the operating knob while the wheel is idle on an elastic support urging it against the roller.

This arrangement always ensures the best engagement conditions between the driving rollers and the driven element since the strip can take different positions in respect to the bar through torsional movements about its axis and transverse slant movements in respect to the bar, yet remaining tangent to the generating line of the cylindrical surface of the roller engaging it.

Figure 2:
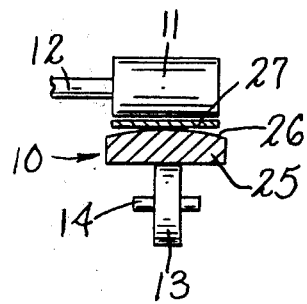

The invention will be now described in detail with reference to the annexed drawing, wherein:

FIG. 1 is a perspective view of the improved unit according to the invention; and FIG. 2 is a detail showing the cross section of the driven element and the engagement thereof with the driving roller.

With reference to FIG. 1, reference P indicates a supporting plate of the driving unit according to the invention provided with a vertical wall A integral therewith.

The composite driven element, generally designated by 10, is connected to tuning bar B of the apparatus at one of its ends, as described above. Element 10 is positioned between a roller 11 keyed to shaft 12 of knob M, supported by wall A, and a wheel 13 whose hub 14 is received within a saddle 15 shaped on an elastic supporting plate element 16 secured to plate P at its end 18. As clearly seen in FIG. 1, the elastic support 16 has a slot 19 wherein wheel 13 can rotate and furthermore its end 20 is fork-shaped and a pin 22 integral with plate P is inserted between branches 21 of fork-shaped end 20.

As clearly seen in FIG. 2, composite element 10 comprises an elongated bar 25 having a substantially rectangular cross section but with a slightly rounded upper face 26 and a strip 27 secured to upper face 26 at its ends 28 by means of two rivets 29. Furthermore, strip 27 is "unloaded" at each end thereof, that is it has two "neck" portions 31 obtained by means of pairs of corresponding notches 30.

With such a construction and arrangement, strip 27, which is of a width identical with the axial length of roller 11, can rotate about its longitudinal axis which is perpendicular to the plane of the drawing of FIG. 2, rolling on rounded upper surface 26 of bar 25 through torsional movements in correspondence with necks 31. Accordingly, strip 27 can always accommodate the inevitable slight variations of the position of roller 11, yet remaining constantly tangent to the cylindrical surface thereof. On the contrary, rigid element 25 associated to movable rod B of the tuning device (not shown) does not rotate and it remains constantly tangent to and engaged with wheel 13 owing to elastic support 18 of wheel 13.

As for the material used, and particularly for strip 27 and roller 11, it should be noted that the material of the roller must be softer than the material of strip 27. For example, a strip 27 of stainless steel requires a roller 11 of phosphor bronze.

I claim:

1. Drive unit comprising first and second cylindrical elements mounted in parallel relationship so as to be rotated on a base and pushed against each other, at least one of said first and second cylindrical elements being driven so as to be rotated, and a flat elongated element engaged between said two cylindrical elements so that a rotation of said two cylindrical elements in one or the other direction causes a corresponding translation of said elongated element, wherein said elongated element comprises a rigid bar having a substantially rectangular cross section but with a slightly convex rounded upper face and a strip secured to said rounded face of said bar only at its two ends, said elongated element being position between said two cylindrical elements with said strip abutting against and being engaged with the driven cylindrical element.

2. Unit according to claim 1, wherein said strip has corresponding notches on each side and at both ends thereof, said notches locally significantly reducing the cross section of said strip so as to allow the strip body to be rotated about its longitudinal axis in respect to the fixed ends, thus varying its position in respect to said rigid bar.

3. Unit according to claim 2, wherein said strip is made of a material harder than the material of said driven cylindrical element with which said strip is engaged.

4. Unit according to claim 3, wherein said driven cylindrical element is keyed on a rotating shaft provided with a knob and rigidly supported on a raised portion of said base, while said second cylindrical element is supported on elastic supporting means mounted on said base below said driven cylindrical element, said elastic supporting means pushing said second cylindrical element against said first cylindrical element.

5. Unit according to claim 4, wherein said elastic supporting means of said second cylindrical element is a bridge-shaped elastic plate having a saddle-shaped upper portion and a longitudinal slot corresponding therewith, said plate being rigidly secured on said base at one of its ends and having the other end freely longitudinally sliding over said base, said second cylindrical element being a wheel having its hub transversally arranged and received in said saddle-shaped portion of said plate and its cylindrical body partially received within said slot.

6. Drive unit according to any one of claims 1-5, wherein said elongated element is associated to the longitudinally movable rod of a tuning device of a radio apparatus so that the position of said rod can be determined by operating said driven cylindrical element.

7. A drive unit comprising:
a cylindrical driving roller having an outer peripheral surface,
a driven element movably mounted for longitudinal movement adjacent said driving roller and having
an upper strip portion adapted for contact with said outer peripheral surface,
a lower rigid portion, and
means for connecting said upper strip to said lower portion for torsional movement of said upper strip relative to said lower portion, and
means for resiliently biasing said driven element toward said driving roller so that said upper strip contacts said outer peripheral surface.

8. The device of claim 7 wherein said lower rigid portion is an elongated bar element.

9. The device of claim 7 wherein:
said resilient biasing means comprises:
a bridge-shaped elastic plate having an upper portion, said plate being adapted for securement to a support surface at one end and slidably mounted to the support surface at the other end, and
a roller element rotatably mounted to said upper portion.

10. A drive unit comprising:
(a) a cylindrical driving roller having an outer peripheral surface,
(b) a driven element movably mounted for longitudinal movement adjacent said roller, said driven element having:
(i) an upper strip portion with first and second end portions, and an upper roller-contacting surface for contact with said outer peripheral surface of said driving roller,
(ii) a lower rigid portion with a non-planar upper surface, said first and second end portions of said upper strip being attached to said lower rigid portion, and
(c) means for resiliently biasing said driven element toward said driving roller so that said upper strip contacts said outer peripheral surface.

11. A drive unit comprising:
(a) a cylindrical driving roller having an outer peripheral surface,
(b) a driven element movably mounted for longitudinal movement adjacent said roller, said driven element having:
(i) an upper strip portion with first and second end portions, opposing longitudinal edges, and an upper roller-contacting surface for contact with said outer peripheral surface of said driving roller, each said edge containing a notch therein adjacent said first end portion and a notch therein adjacent said second end portion, and
(ii) a lower rigid portion with a non-planar upper surface, said first and second end portions of said upper strip being attached to said lower rigid portion, and
(c) means for resiliently biasing said driven element toward said driving roller so that said upper strip contacts said outer peripheral surface.

12. A drive unit comprising:
(a) a cylindrical driving roller having an outer peripheral surface,
(b) a driven element movably mounted for longitudinal movement adjacent said roller, said driven element having:
(i) an upper strip portion with first and second end portions, and an upper roller-contacting surface for contact with said outer peripheral surface of said driving roller,
(ii) a lower rigid portion with an upper surface convex in cross section, said first and second end portions of said upper strip being attached to said lower rigid portion, and
(c) means for resiliently biasing said driven element toward said driving roller so that said upper strip contacts said outer peripheral surface.

13. A manual drive unit for use with a radio having a support surface, comprising:
a rotatable cylindrical driving roller having an outer peripheral surface, a driving shaft rotatably mounted to a support surface and connected to said driving roller, an elongated driven element movably mounted for longitudinal movement adjacent said driving roller and adapted for operational connection to the tuning rod of a radio, said driven element having:

an elongated upper strip portion adapted for tangential contact with said outer peripheral surface, a lower elongated rigid portion, and means for connecting said upper strip portion to said lower portion for yieldable torsional movement of said upper strip relative to said lower portion, and means for yieldably biasing said driven element toward said driving roller so that said upper strip engages said outer peripheral surface.

14. The device of claim 13 wherein:

said upper strip portion has first and second end portions and an upper roller-contacting surface, and said connecting means comprises said lower rigid portion having a non-planar upper surface and said first and second end portions of said upper strip portion being attached to said lower rigid portion.

15. The device of claim 14 wherein:

said upper strip portion has opposing longitudinal edges with each edge having a notch therein adjacent said first end portion and said second end portion.

16. The device of claim 14 wherein:

said upper surface of said lower rigid portion is convex in cross section.

17. The device of claim 13 wherein said biasing means comprises:

a bridge-shaped elastic plate having an upper portion, said plate being secured to said support surface at one end and slidably mounted to said support surface at the other end, and a roller element rotatably mounted to said upper portion.

18. The device of claim 17 wherein said lower rigid portion is an elongated bar element having a flat lower surface in contact with said roller element.

* * * * *